United States Patent [19]

McFarland, Jr.

[11] Patent Number: 4,461,248
[45] Date of Patent: Jul. 24, 1984

[54] BROAD TORQUE BAND PRODUCING INTAKE MANIFOLD FOR AN INTERNAL COMBUSTION ENGINE

[75] Inventor: James D. McFarland, Jr., Torrance, Calif.

[73] Assignee: Edelbrock Corp., El Segundo, Calif.

[21] Appl. No.: 353,327

[22] Filed: Mar. 1, 1982

Related U.S. Application Data

[63] Continuation-in-part of Ser. No. 955,937, Oct. 30, 1978, Pat. No. 4,318,371.

[51] Int. Cl.³ .............................................. F02B 75/20
[52] U.S. Cl. ........................... 123/52 M; 123/52 MV; 123/59 R
[58] Field of Search ......... 123/52 M, 52 MB, 52 MV, 123/59 R

[56] References Cited

U.S. PATENT DOCUMENTS

| | | | |
|---|---|---|---|
| 3,931,811 | 1/1976 | McFarland | 123/52 M |
| 4,013,049 | 3/1977 | Dilgard et al. | 123/52 M |
| 4,119,067 | 10/1978 | Aldrich et al. | 123/52 MB |
| 4,186,695 | 2/1980 | Gartner et al. | 123/59 R |
| 4,300,488 | 11/1981 | Cser | 123/52 MB |

Primary Examiner—Craig R. Feinberg
Attorney, Agent, or Firm—Christie, Parker & Hale

[57] ABSTRACT

An intake manifold for internal combustion engines has a plurality of independent runners emanating from a central plenum. Different sets of runners have different cross-sectional areas matched to flow velocity through the manifold at maximum torque and desired engine speeds to produce a wide high torque band. The length of each runner of each set corresponds to a harmonic frequency of the fundamental frequency of air at standard temperature, but the frequency differs for each runner set. Within each set, runner cross-sectional areas are constant throughout their length. In one embodiment, the runners curve from a plenum to their exits and in the curve each runner's cross section is regular trapezoidal with the small side of the trapezoid on the inside curve and the shape of the trapezoid effecting constant static pressure throughout the cross section.

26 Claims, 14 Drawing Figures

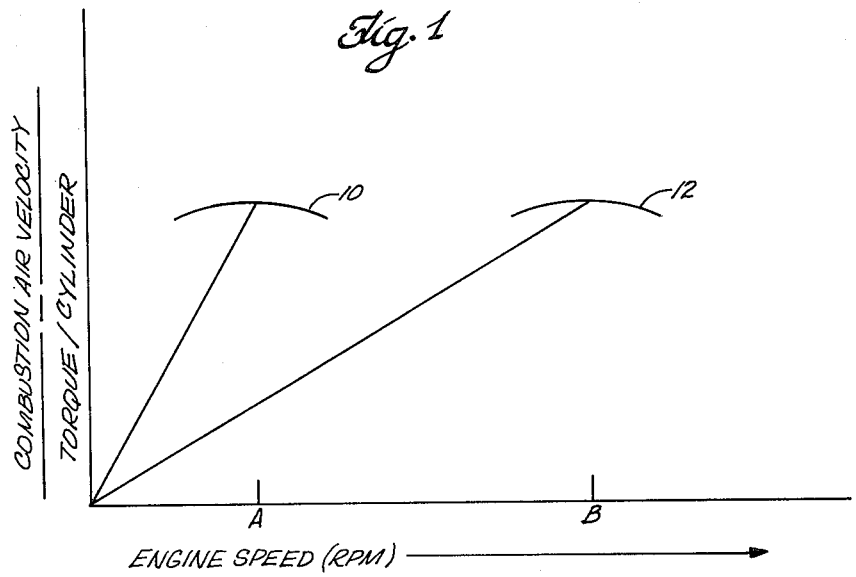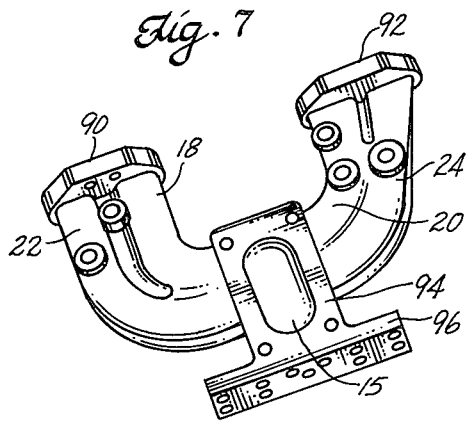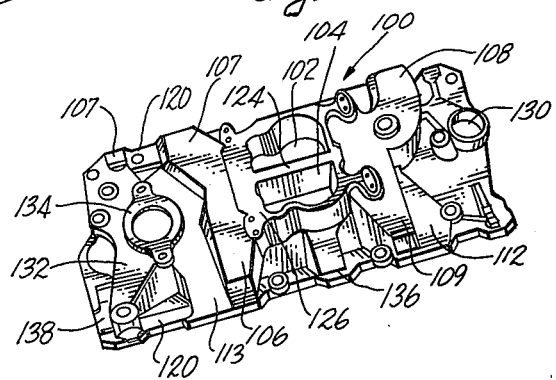

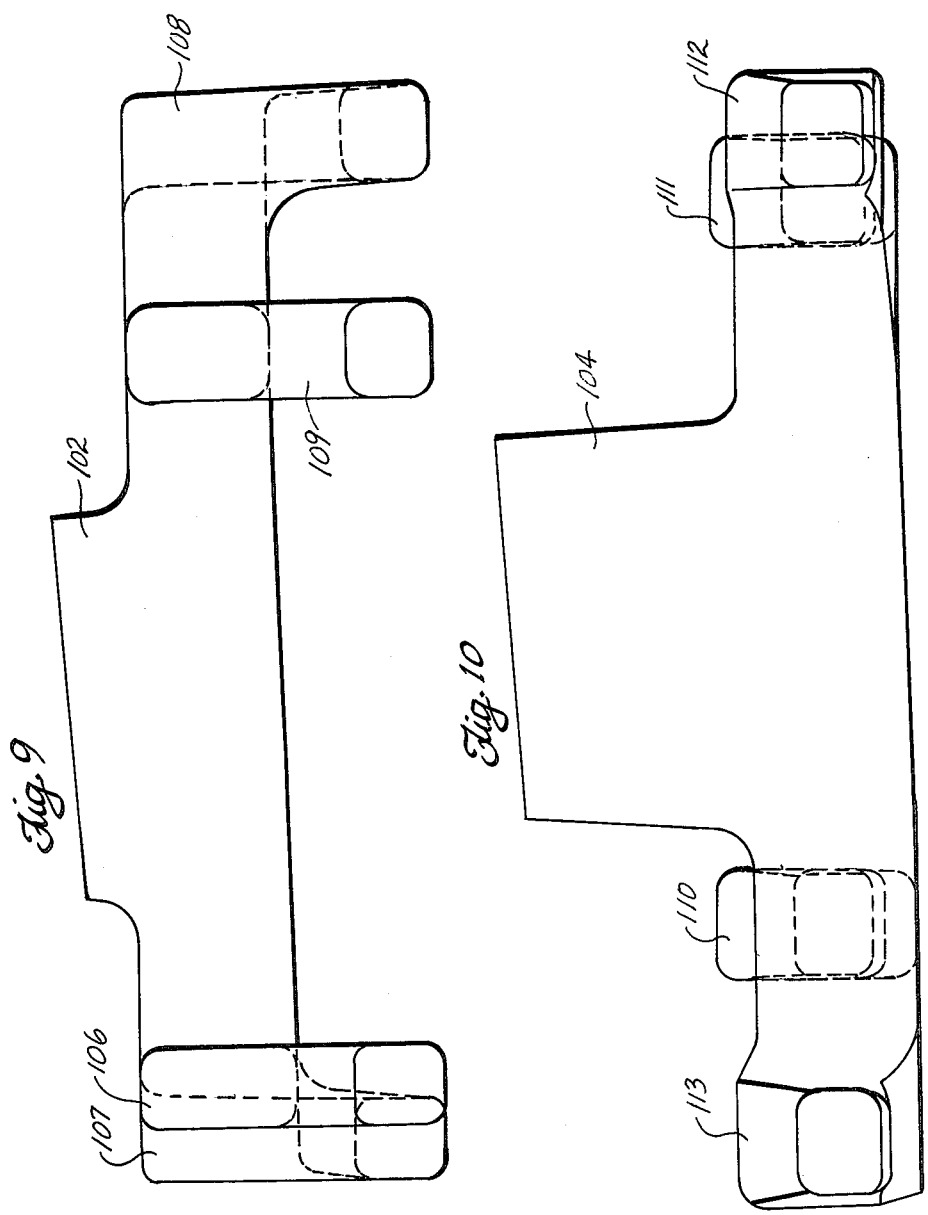

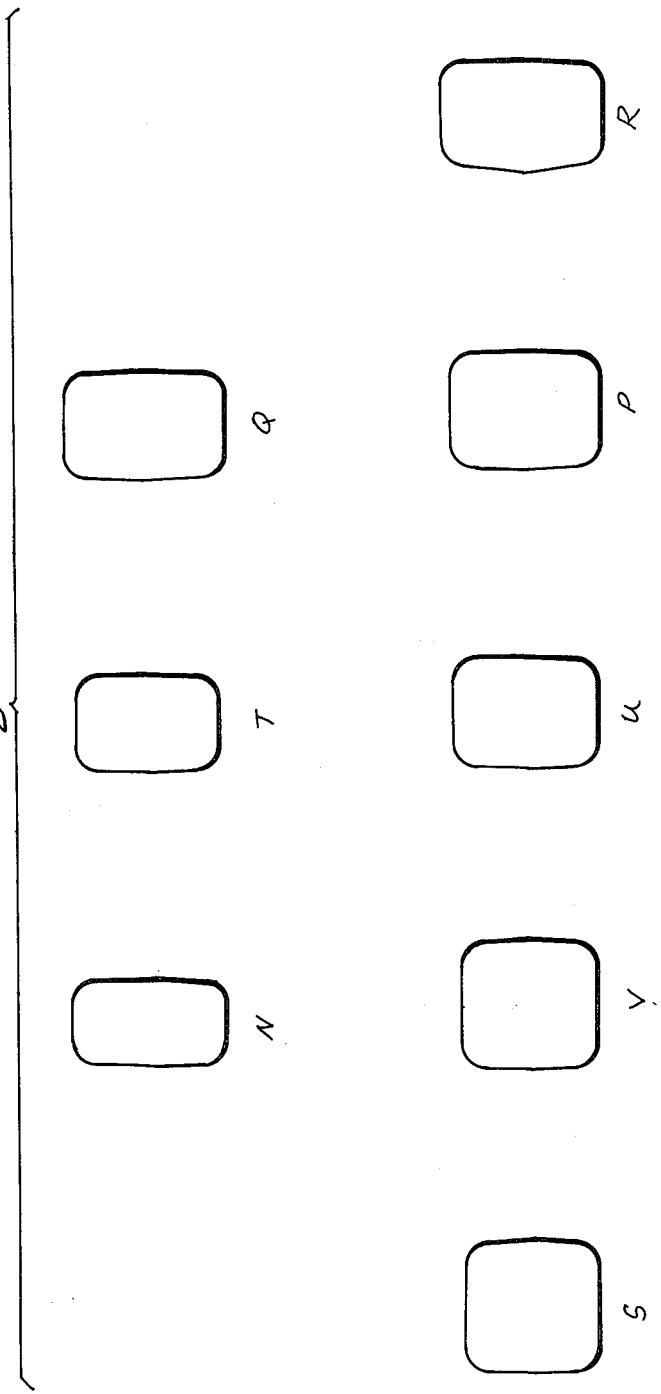

BROAD TORQUE BAND PRODUCING INTAKE MANIFOLD FOR AN INTERNAL COMBUSTION ENGINE

CROSS-REFERENCE TO RELATED APPLICATION

The present application is a continuation-in-part of U.S. application Ser. No. 955,937, filed Oct. 30, 1978, now U.S. Pat No. 4,318,371.

BACKGROUND OF THE INVENTION

The present invention relates to intake manifolds for internal combustion engines. More in particular, the present invention relates to a unique manifold that effects a wide band of high torque.

Intake manifolds of internal combustion engines transport combustion air to the cylinders of the engine for consumption. In a carbureted internal combustion engine, an intake manifold also transports fuel with the air. The carburetor typically mounts over a plenum of the manifold. The fuel and air mixture enters the plenum and from the plenum travels to the cylinders through ducts called runners. The runners exit at inlet ports of the engine. These ports lead to the cylinders through inlet valves.

A fuel and air mixture is drawn into each cylinder of an engine by a vacuum created there by downward piston movement during the inlet cycle of the cylinder, although this pressure differential that forces the fuel and air mixture into the cylinder may be augmented substantially by a turbo charger or a super charger. Inlet and exhaust valves into each cylinder provide for the admission of the fuel-air mixture into the cylinder and the exhaustion of products of combustion from the cylinder. These valves open and close every other revolution in a four-cycle engine, and do so gradually; that is, the valves do not open and close instantaneously but over several degrees of engine revolution.

The dynamics of induction of fuel and air into an engine are very complicated, making generalization difficult. The factors affecting induction include intake and exhaust valve timing, piston speed, inertia of gases undergoing induction, fluid friction, resonance, intercylinder interference, and induction geometry, to name a few.

The intake timing of today's internal combustion engines has an inlet valve opening while its companion exhaust valve is closing and before the piston reaches top dead center. An inlet valve closes several crank degrees after its piston reaches bottom dead center. This timing accommodates the several crank degrees of engine revolution required to effectively open and close an inlet valve. In other words, to have the inlet valve as open as possible during the descent of the piston, the inlet valve is given a head start and starts to open before the piston actually begins to descend. To have the inlet valve open and to take advantage of gas inertia, the inlet valve does not close until the piston has begun ascending in the cylinder again. Gas inertia is sufficient to overcome the adverse pressure caused by the ascending piston.

It is quite apparent that the more mixture that is inducted into a cylinder with each cycle, the more power an engine will have, and the more efficient it will be. The measure of engine efficiency reflecting the amount of cylinder charge is "volumetric efficiency" which is the volume of air a cylinder actually receives divided by the volume swept by the piston. If the air flowing into the runners of an inlet manifold is traveling fast, its inertia results in an additional amount of mixture charged into the cylinders and an increase in volumetric efficiency compared with the charge resulting from slower air. More specifically, the torque of an engine at relatively low engine speeds is enhanced by increasing the velocity of the mixture in the intake manifold, and this does not adversely affect the manifold's performance because the manifold would not be used at high engine speeds where induction loss could be significant.

Piston speed directly measures the pumping characteristics of an engine. The higher the piston speed the more mixture is inducted into the engine in a given time. Piston speed also generates pressure pulses that affect movement of the mixture in the intake manifold. As the piston descends, a negative pressure signal results and this signal travels upstream in the manifold. It is this negative pressure that produces induction. As the piston ascends, it produces a positive pressure signal that travels upstream in the manifold and opposes induction. The magnitude of the signals is a direct function of piston speed which varies even at constant engine speed. The pressure signals travel at the speed of sound; the mixture travels much slower. The pressure signals can be used to enhance volumetric efficiency. As a pressure pulse travels up a runner of a manifold and reaches atmosphere, which may be in the plenum of the manifold, the air there overcompensates for the disturbance caused by the pulse. Thus, when a pressure pulse traveling upstream is positive with respect to mean inlet manifold pressure, it initially compresses the air in the plenum and the air is pushed out of the way creating a locally rarified zone. The resulting negative pressure travels down the manifold and detrimentally affects the flow of gas in the manifold by reducing the pressure differential. Of more interest is a negative pressure pulse traveling upstream and produced by a descending piston. This negative pressure pulse will create a rarifaction in the plenum and air will rush in to fill the resultant depressed zone generating a positive pressure pulse that travels down the runner towards the cylinder. If the pulse arrives at the cylinder at the right time, say when the inlet valve is about to close, the pulse can add significant quantities of mixture to the cylinders to increase the power of the engine by increasing the volumetric efficiency of the engine. This is known as intake manifold tuning and obviously relies upon the resonance of the mixture which, practically speaking, means resonance of the air.

The speed of a pressure pulse is independent of manifold geometry. The velocity of the air in a manifold's runners, however, is not.

At open throttle, piston speed and runner cross-sectional area determine the mixture speed through a manifold. Mixture velocity generally is a direct, linear function of piston speed, at least at low engine speeds, with runner cross-sectional area held constant. Runner gas velocity is an inverse function of runner cross-sectional area; as the cross-sectional area of the manifold runner decreases, the air increases in velocity. As the length of the runner increases, the time required for a pulse to travel upstream and back downstream increases.

The pressure history of one cylinder in a multiple cylinder engine can affect the induction performance in other cylinders. Thus pressure pulses traveling up a runner from one cylinder can interfere with the pressure within other runners. Generally, it has been the practice to design inlet manifolds to eliminate intercylinder interference.

The isolation of cylinders in an internal combustion engine to avoid intercylinder affects on induction has taken different forms. One isolation technique in practice is the so-called two-plane, over and under, 180° manifold. This manifold has been a standard for some time for most American production V-8 engines using a single four-barrel or two-barrel carburetor. It has two plenums. Each plenum does not directly communicate with manifold runners; instead, stubs between the runners and the plenum communicate the runners with the plenum. Runners sharing a stub are remote from each other in the sense of the engine's firing order. The plenums of the manifold are isolated from one another, and alternate runners in the sense of an engine's firing order go to alternate of the plenums. By isolating alternate cylinder combustion events from each other through the use of two plenums, intercylinder effects are attenuated.

An independent runner manifold, such as described in U.S. Pat. No. 3,744,463 to James D. McFarland, has a common plenum for all the cylinders of an engine directly communicating with the cylinders through an independent runner for each cylinder. The plenum employs no partitions to separate the plenum into two plenums. Independent runner manifolds in many applications have advantages over two-plane manifolds. The advantages inhere from simpler induction paths afforded by the manifold and include better cylinder-to-cylinder air-to-fuel ratio uniformity and lower pumping work.

Particularly with engines that have modest power outputs, it is important to have a broad band of relatively high torque so that engine performance over a range of engine speeds is good. With a narrow band of high torque engine performance at engine speeds out of the band may well be sluggish or mediocre, even though quite satisfactory within the band.

SUMMARY OF THE INVENTION

The present invention provides an intake manifold for an internal combustion engine characterized in producing high torque over a broad band of engine speed. It has been found that at engine maximum torque, air velocity through a runner has a particular value, regardless of piston speed or runner cross-sectional area. The present invention takes advantage of this phenomenon in a multi-runner manifold to produce engine maximum torque at more than one engine speed with the effect that the torque band of high torque is effectively widened, although peak torque value is reduced. This is done by two or more runner sets. Each set is tuned to a different harmonic frequency from the fundamental frequency of air at standard temperature. Each set has a different cross-sectional area that is related to the engine speed at which maximum torque is desired for that runner set by producing the air valocity at which engine maximum torque occurs. Thus for a four-cylinder engine two runner sets may be employed. One of the runner sets has a cross-sectional area to effect engine maximum torque at a first, comparatively low engine speed. The second runner set has a cross-sectional area to produce maximum torque at a selected higher engine speed. The runners of the set that produces maximum torque at low speed typically will be longer and of smaller cross-sectional area than the runners that produce maximum torque at a higher engine speed.

In one form, the present invention contemplates an intake manifold for combustion air for a reciprocating internal combustion engine of the type where combustion air velocity through the manifold is a direct function of engine speed. The manifold has two sets of independent runners. The first set has runners of substantially equal length and cross-sectional area. Each first set runner has a length corresponding to a harmonic frequency of the fundamental frequency of air at standard temperature and a cross-sectional area such that at a first engine speed combustion air velocity through the runner is substantially equal to the velocity at engine maximum torque. The runners of the second set are of substantially equal length and cross-sectional area with the area chosen such that at a second engine speed produces combustion air velocity substantially equal to the velocity at engine maximum torque. The first and second engine speeds differ as do the cross-sectional areas of the different runner sets. The length of each second set runner corresponds to a harmonic frequency of the fundamental frequency of air at standard temperature different from that of the first runner set. The result of this array is peaks of torque at the first and second chosen engine speeds and a wider torque band, although the torque output of the engine is less at each of the chosen engine speeds than it would be if all the runners were tuned to a particular engine speed.

The preferred form of the present invention has a manifold that includes a plenum with each runner of each of the sets having an entrance opening into the plenum. The plenum is centrally disposed along a longitudinal length of the manifold, which length corresponds in orientation to the length of the engine with which the manifold is used. In one of the preferred embodiments of the present invention each runner of each of the sets curves from the plenum to an exit. The exits are disposed to register with individual inlet ports of the engine with which the manifold is used. Each runner of each of the sets along its curve has a regular trapezoidal cross section, with the wall of the inside of the curve being a short side of the trapezoid and the wall on the outside of the curve being a long side of the trapezoid. The trapezoidal shape is such as to produce substantially equal static pressure throughout the cross section. In one embodiment the cross-sectional area shape changes from trapezoidal to circular as the exit to the runners is approached. It has been found that the equalization of static pressure across a runner cross section lowers fuel separation and produces more uniform intercylinder fuel and air distribution.

These and other features, aspects and advantages of the present invention will become more apparent from the following description, appended claims and drawings.

BRIEF DESCRIPTION OF THE FIGURES

FIG. 1 is a plot of engine speed versus torque illustrating the principles applicable to the present invention;

FIG. 7 is a perspective view of a manifold produced with the core of FIG. 2;

FIG. 9 is an elevational view of an upper plane or set of runners of FIG. 8, which runners have a relatively small cross-sectional area;

FIG. 10 is an elevational view of a lower plane or set of runners of FIG. 8, which runners have a relatively small cross-sectional area;

FIG. 13 is sectional views taken along the indicated sectional lines of FIGS. 8, 11 and 12; and FIG. 14 is a view in plan of a manifold constructed with the core layout of FIG. 8.

DESCRIPTION OF THE PREFERRED EMBODIMENT

Figure 2:
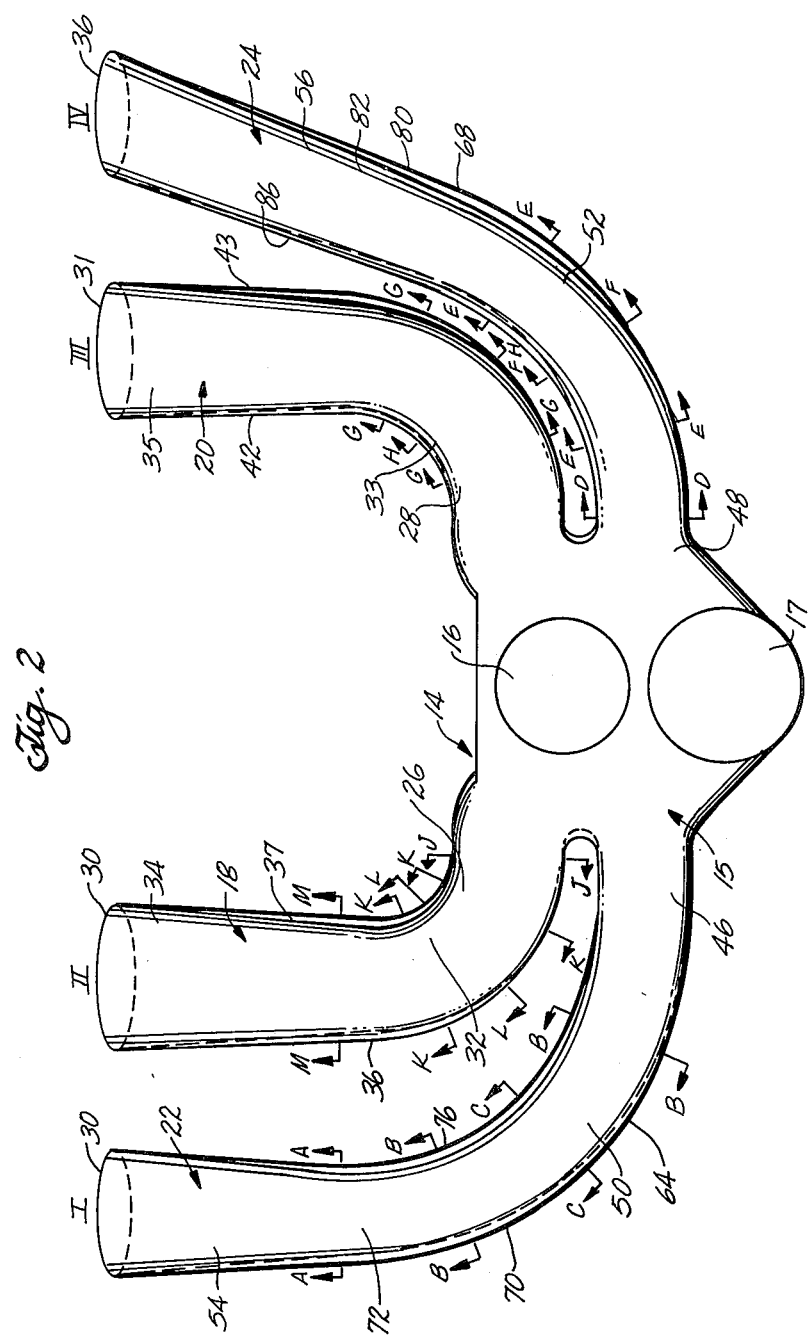
FIG. 2 is a top plan view of the core layout of one preferred form of the present invention suitable for a four-cylinder in-line Datsun engine in accordance with the preferred construction of the present invention.

FIG. 1 is a plot of torque developed in a reciprocating internal combustion engine per cylinder versus engine speed for an engine equipped with a manifold constructed in accordance with the present invention. In a given engine, velocity of combustion air in a manifold at engine maximum torque has a unique value. With that value and within limits, the engine speed at which maximum torque develops can be changed. This is so because the velocity of combustion air through a manifold is a function only of engine piston speed and runner cross-sectional area. The dependency on piston speed is for all intents and purposes linear and proportional. Average piston speed is also a direct and linear function of engine speed. Combustion air velocity in the manifold is inversely proportional to cross-sectional area. Thus, by manipulating the cross-sectional area at a given engine speed the velocity of combustion air in the manifold can be changed and with this technique the speed at which maximum torque occurs can be changed. When the manifold is used to transport a fuel and air mixture, the velocity of the air determines fuel velocity and so combustion air velocity is the equivalent of fuel and air mixture velocity.

In FIG. 1, a first torque curve 10 has a peak torque at about an engine speed of "A". At the engine speed the unique value of combustion air velocity for engine maximum torque is obtained by sizing the runner cross section. A second torque curve 12 has a maximum at engine speed "B", and a runner cross-sectional area chosen to effect this maximization. Torque curve 10 and torque curve 12 may be for two sets of runners, each runner set having a cross-sectional area chosen to effect maximum torque for that runner set at a unique engine speed different from the other runner set. The result is the occurrence of maximum torque at distinct engine speeds and an effective broadening of the torque curve over that which would exist without the different cross-sectional area runner sets. In other words, some but not all of the runners are chosen to provide engine maximum torque at a given engine speed. The rest of the runners are chosen to provide engine maximum torque at a different engine speed. The net effect of this is to increase the band of reasonably high torque. There is a drop in peak torque performance of the engine over that obtainable with runners of constant cross-sectional area, but the broadening makes the engine more responsive over a broader range of engine speeds than a manifold with runners all of the same cross-sectional area.

A second phenomenon exploited with the present invention is tuning. As brought out in the Background of the Invention section of this disclosure, tuning produces enhanced volumetric efficiency because of greater cylinder charging at chosen engine speeds. Tuning for a given engine speed requires runner lengths between atmosphere and the inlet valve of an engine that produce resonance at the fundamental frequency of air or a harmonic of that frequency. Tuning is best at harmonics of the fundamental frequency because runner lengths are shorter than at the fundamental frequency. Tuning results when a negative pressure wave travels up a runner to atmosphere to produce a local rarified volume there, followed by a compression wave filling the volume and traveling back down the runner to be at the inlet port when the inlet valve is open. The principles of the present invention utilize tuning phenomena to augment fuel and air charging at the selected engine speeds at which torque peaks are to occur. Because the engine speeds differ for different torque peaks, the tuning required requires different harmonics so that the pulse will arrive back at the inlet port at the right time.

The runners of the manifolds of this invention have constant cross-sectional areas throughout their length, although cross-sectional areas differ between different runner sets. This results in desired maximum torque producing velocity all along the runner length at the chosen engine speed. Strictly speaking, the velocity of combustion air in the runners is a function of piston speed. Piston speed is a function of engine design, but average engine speed can be directly related to engine speed for a given design. For that reason engine speed is chosen as the variable most often mentioned in this description.

With these principles in mind, a description of two preferred forms of the present invention will be presented: one for a four-cylinder in-line engine and the other for a V-8 engine.

Turning first to the former, FIG. 2 shows in plan view a core layout 14 for a four-cylinder in-line engine. This core outlines the volume and shape of manifold runners and plenum and is used in making a casting of the manifold. The physical manifold has walls bounding the volume defined by the core and by cope and drag plates. Such a manifold will be discussed briefly with reference to FIG. 7.

The core defines a central plenum 15. The plenum lies directly below the primary and secondary throats of the carburetor used with the manifold, the areas of which are shown by upwardly extending plugs 16 and 17. Plenum 15 serves interior runners 18 and 20 and exterior runners 22 and 24. Interior runners 18 and 20 are of equal length and of a length chosen to effect resonance at a harmonic frequency of the fundamental frequency of air at standard temperature. The cross-sectional area of each of runners 18 and 20 is constant and is determined by that combustion air velocity at which maximum torque occurs. Runners 18 and 20, being shorter than runners 22 and 24, produce harmonic resonance at a higher engine speed than runners 22 and 24. The cross-sectional area of the runners 18 and 20 is correspondingly larger than the cross-sectional area of runners 22 and 24. This relationship between the cross-sectional area, runner length and harmonic resonance is the rule with the present invention. In the embodiment of the invention illustrated, the cross-sectional area of runners 18 and 20 is about 1.25 times as large as the cross-sectional area of runners 20 and 22.

The runners are independent from each other and all open into common plenum 15. The resonant determining length is the length of each runner and the corresponding inlet port.

Figure 3:
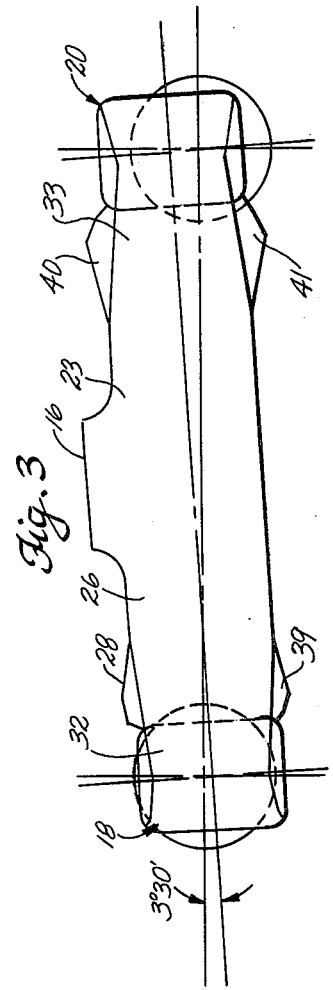
FIG. 3 is a view in elevation of the large runner set of the manifold of FIG. 2.

In FIG. 3, runners 18 and 20 are shown in elevation together with plug 16. As illustrated there and in FIG. 2, the runners begin in zones 26 and 28 approximately parallel to a lengthwise axis of the manifold and parallel to runner exits 30 and 31 of runners 18 and 20, respectively. Downstream of sections 26 and 28, the runners bend in plan substantially 90° in curved zones 32 and 33 and continue in straight, laterally extending zones 34 and 35. An outer wall 36 and an inner wall 37 of runner 18 are simply curved and generally vertical. As seen in FIG. 3, a roof 38 and a floor 39 of runner 18 and a roof 40 and a floor 41 of runner 20 have complex shapes determined by constant runner cross-sectional area, and rectangular in places, trapezoidal in places, and circular in places cross sections. The views in FIGS. 2 and 3 are in horizontal and vertical planes, and the plane of the manifold is not horizontal, departing from the horizontal by 3° 30′ as shown in FIG. 3. This slight tilt corresponds to the tilt of the Datsun engine used with the manifold. Because of the tilt and plane of view in FIG. 2, outer wall 36 undercuts roof 40 in curved zone 32 and laterally extending zone 34. Inner wall 37 extends out from roof 40 in these zones. For runner 20, an inner wall 42 and an outer wall 43 undercut and extend from roof 40 of the runner, respectively, in curved zone 33 and laterally extending zone 35 in the manner of their correspondents in runner 18. Roof 40 and floor 41, like their counterparts, are a complex of different shapes determined by rectangular in places, trapezoidal in places, and circular in places cross sections and constant cross-sectional area.

Figure 5:
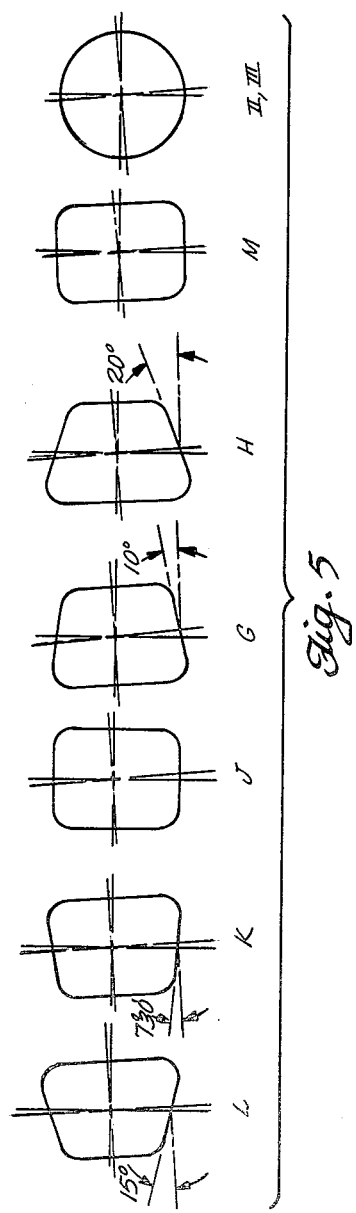
FIG. 5 is sectional views of the large runners taken along the indicated sectional lines of FIG. 2.

FIG. 5 illustrates cross sections of runners 18 and 20 at section planes indicated in FIG. 2. The sections would be rotated the 3° 30′ tilt when the manifold is mounted, as shown by the two sets of axes. Runner 18 starts at the plenum with substantially a rectangular cross section, as seen in section "J". The runner continues into curved zone 32 where it has transformed into a trapezoidal cross section, with a small side of the trapezoid towards the outside of the curve, as seen in section "K". The trapezoidal cross section is maintained and becomes more exaggerated further into the curve, as seen in section "L". The roof and floor of the runners in the trapezoid go from a 7° 30′ in section "K" to 15° in section "L" from the horizontal, as shown in FIG. 5. In section "M", outside of the curve, the runner again becomes substantially rectangular in cross section, although slightly trapezoidal. At the exit of the runner, at section II, the runner is circular to match the port configuration of the Datsun engine with which the manifold is used.

The cross section progression for runner 20 closely matches that of runner 18. As can be seen in section "G", which is in curved zone 33, the runner cross section is trapezoidal, the cross section progresses to an exaggerated trapezoid in section "H", returns again to a more attenuated trapezoid at the downstream section "G", and finally progresses into a circular cross section at exit section III. The runner cross-sectional areas are substantially constant from plenum to exit to maintain combustion air velocity constant throughout the runners. The roof and floor of the runner in sections "G" and "H" depart from the horizontal by 10° and 20°, respectively.

Figure 6:
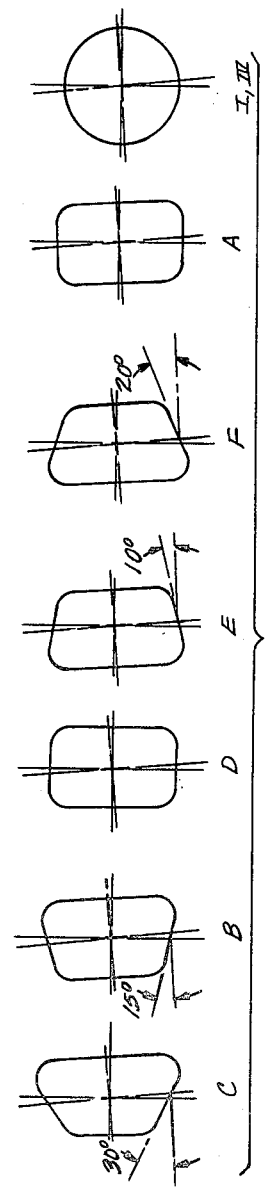
FIG. 6 is sectional views of the small runners taken along the indicated sectional lines of FIG. 2.

The same considerations obtain for runner pairs 22 and 24. As can be seen from FIGS. 2, 4 and 6, runners 22 and 24 begin at plenum 15 substantially parallel to a lengthwise axis of the manifold in zones 46 and 48. They progress into curved zones 50 and 52 and finally into terminal, laterally extending zones 54 and 56. As is readily apparent from FIG. 2, runners 22 and 24 are not symmetrical in plan, although they have the same effective length. Again the runner cross-sectional areas of runners 22 and 24 are constant and equal to each other, but undergo a shape change as indicated by the various sectional planes in FIG. 2 and sections of FIG. 6. Thus for runner 22 at section "B", the runner has a trapezoidal cross section, with the small side of the trapezoid extending substantially vertical and on the outside of the curve. The complementary large side of the trapezoid is on the inside of the curve. Progressing downstream in the runner, section "C" has an exaggerated trapezoidal cross section with the small side of the trapezoid still on the outside, but relatively much shorter with respect to the long side than the corresponding sides of section "B". Section "C" is deep into the curve. The trapezoidal section begins to give way after this point to a more or less rectangular section at "A", as can be seen with the downstream section "B" and section "A". The runner ends at a circular exit at section I.

Runner 24 shows substantially the same cross section, progressing from more or less a rectangular cross section at "D" close to the plenum, into a slight trapezoidal cross section at "E", into a more exaggerated trapezoidal section at "F", then back again at downstream section "E", and ending as a circular cross section at exit IV.

The roof and floor departure from the horizontal for runners 22 and 24 are 30″ in section "C", 15° in section "B", 10° in section "E", and 20° in section "F". Again, the tilt is indicated by the two sets of axes.

Figure 4:
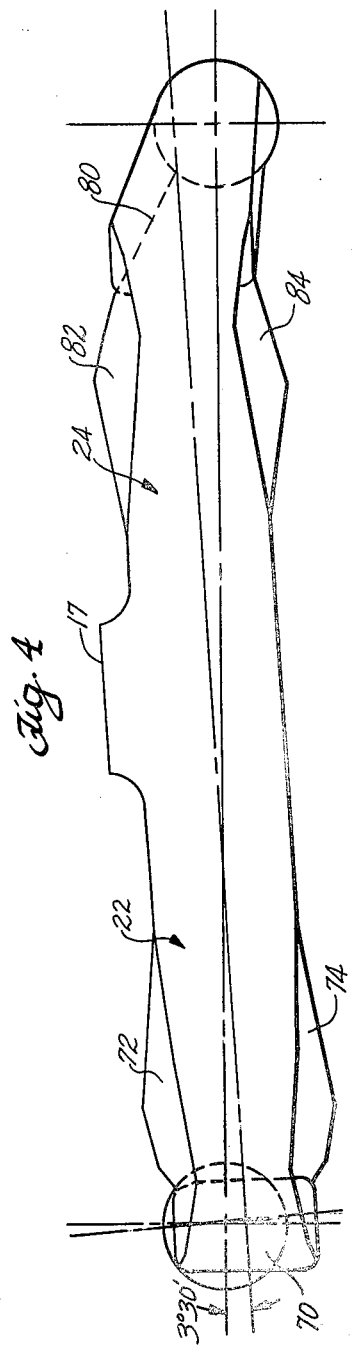
FIG. 4 is a view in side elevation of the small runner set of the manifold of FIG. 2.

As is the case for runners 18 and 20, the side walls of runners 22 and 24 are not vertical because of the manifold tilt. Runner 22 has an outer wall 70 that describes a simple curve but is tucked under a roof 72 of the runner to meet a floor 74 (as seen in FIG. 4). The wall tucks under in the curved zone and into the laterally extending zone. An interior side wall 76 extends outwardly from roof 72 in the curved and terminal zones to meet the floor. Similarly to runner 20, runner 24 has a simply curved outer side wall 80 extending outwardly from a roof 82 to meet a floor 84 in its curved and laterally extending zone. An inner wall 86 tucks under roof 82 to meet floor 84. The inner wall is also simply curved.

With reference to FIG. 7, a manifold produced with the cores of FIG. 2 is shown and will be briefly described. The manifold has mounting brackets 90 and 92 at the terminal ends of the runners 18, 20, 22 and 24. The brackets have holes through them for receiving manifold mounting fasteners. Plenum 15 lies beneath a carburetor mounting base 94 that has a vertically depending EGR mounting plate 96. Runners 18, 20, 22 and 24 have a wall thickness determined by the difference between the core dimension and the cope and drag plates associated dimensions, adjusted for shrinkage.

Figure 8:
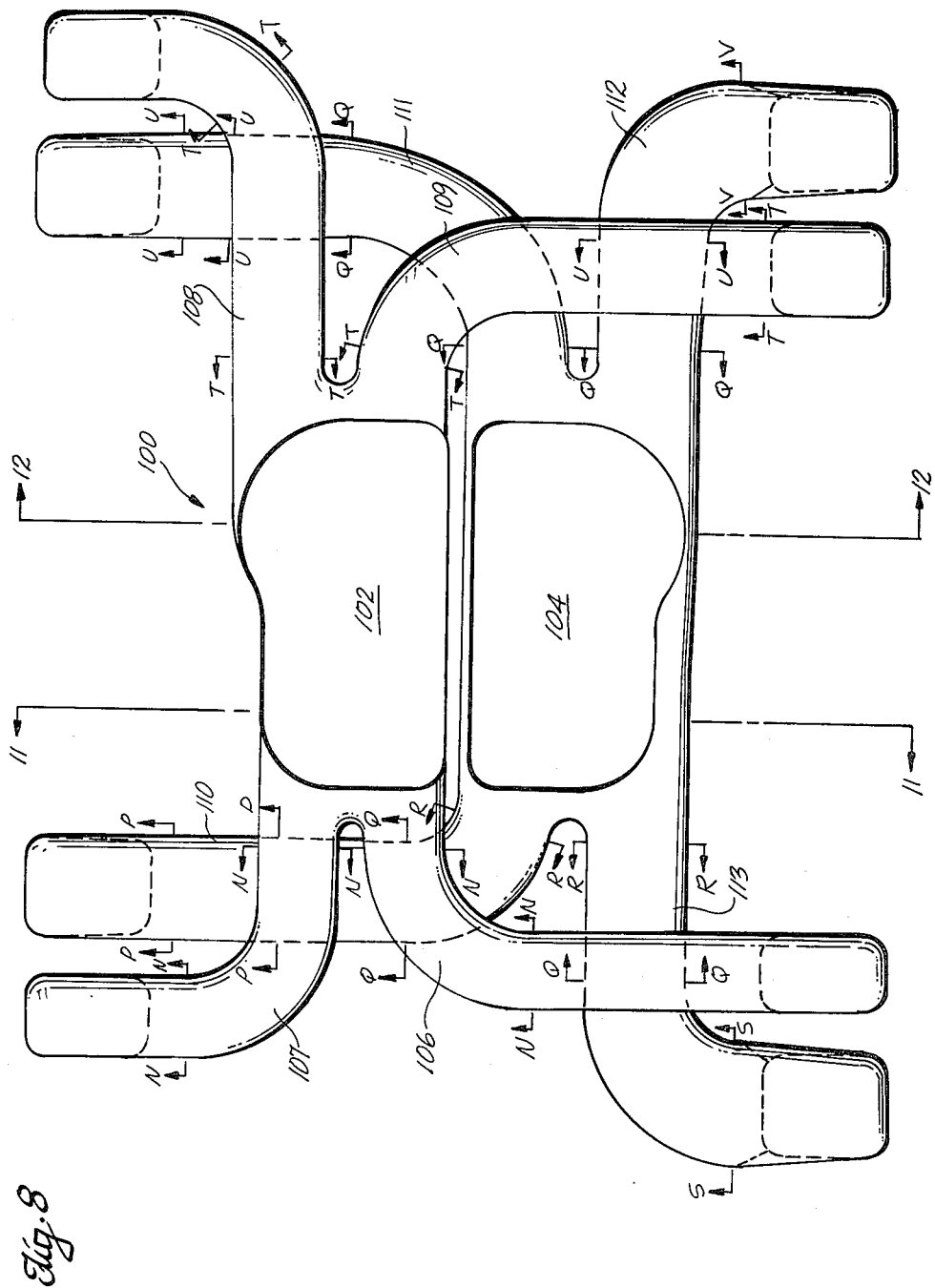
FIG. 8 is a core layout for a V-8 engine in accordance with the preferred construction of the present invention.

FIG. 8 illustrates the core layout for a small block V-8 Chevrolet engine of a manifold constructed in accordance with the principles of the present invention for such an engine. It differs in many respects from the manifold shown for the in-line engine. A major difference is that the runners of the manifold do not take a trapezoidal cross section. A second difference is that the terminal ends of the runners are rectangular, and not circular. A third difference is the use of two plenums separated from one another to provide against intercylinder interference. Thus in the latter, two plenums are used to prevent intercylinder interference, and the runners served by each of the plenums themselves serve cylinders which alternate in the sense of the engine's firing order between plenums. In other words, considering the order of an engine's firing, every other runner will be served by the same plenum. The equality of runner length necessitated for the tuned aspect of the invention is achieved by judicious pairings of runner layout considering the distance from the plenum to a port being served by the runners in both elevation and plan, and the placement of each plenum to one side of the center line of the manifold.

Figure 11:
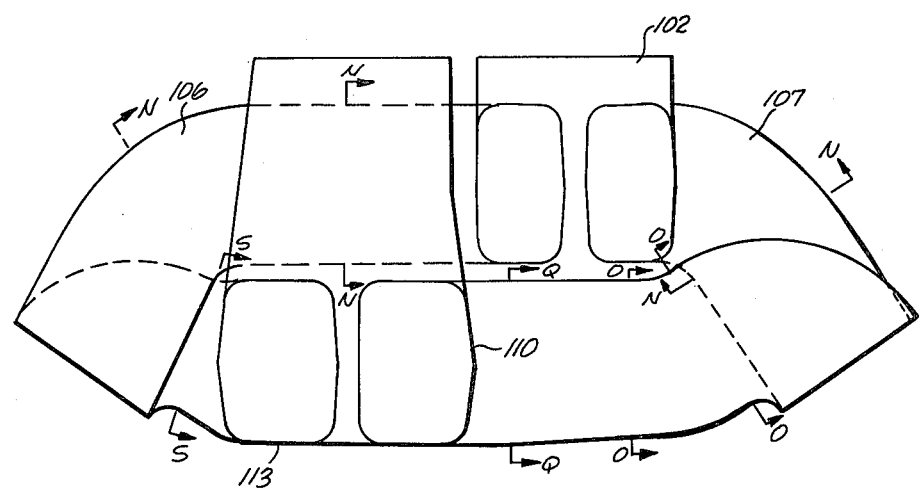
FIG. 11 is a view taken along lines 11—11 of FIG. 8.
Figure 12:
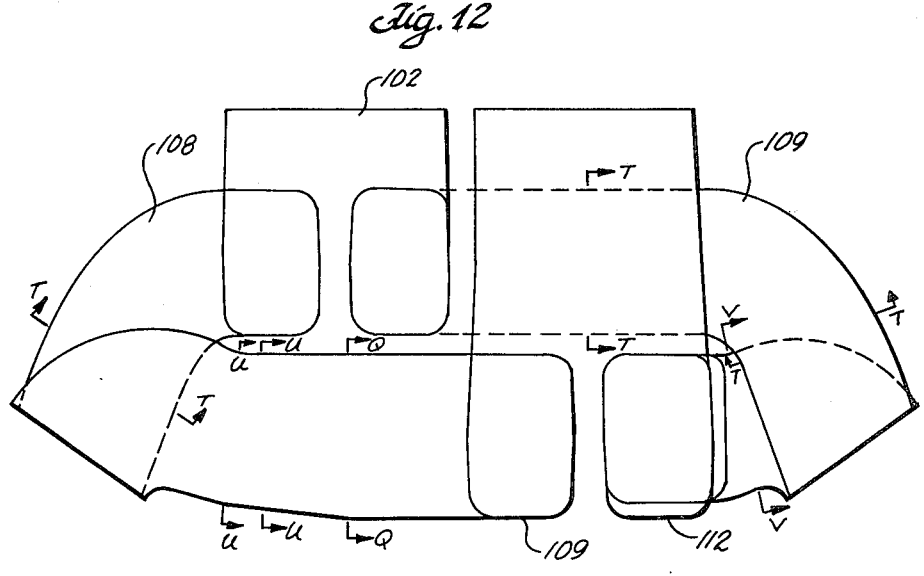
FIG. 12 is a view taken along lines 12—12 of FIG. 8.

In FIG. 8, the cores are indicated in general by reference numeral 100. They define an off-center plenum 102 and an off-center plenum 104. Plenum 102 serves a first set of runners 106, 107, 108 and 109. As can be seen in FIGS. 11 and 12, these runners open into the plenum close to the top of the plenum. Runners 107 and 108 serve longitudinally remote engine inlet ports relative to the ports served by runners 106 and 109. On the other hand, the ports served by runners 106 and 109 are laterally more remote from plenum 102 than the ports served by runners 107 and 108.

Plenum 104 serves a second set of runners 110, 111, 112 and 113. These runners in general are lower in elevation than runners 106, 107, 108 and 109, although they terminate at the same elevation. Thus runners 106, 107, 108 and 109 must traverse a larger vertical rise between the plenum and their exits than do the runners 110, 111, 112 and 113, as can be seen again in FIGS. 11 and 12. Runners 110 and 111 serve longitudinally more proximate ports than do runners 112 and 113. On the other hand, the latter two runners serve laterally more proximate ports than do runners 110 111, owing to the position of plenum 104, closer to the exits of runners 112 and 113.

The runners within each runner set are sensibly equal in length and that means that they are of a length suitable to produce resonance at a harmonic frequency of the fundamental frequency of air at standard temperature. This can happen over a range of lengths. As in the previously described embodiment, the cross-sectional area of the runners within a runner set is constant throughout the length of the runners and is equal as between runners of a set.

The runner set 106, 107, 108 and 109 has a cross-sectional area smaller than the runner set 110, 111, 112 and 113. Runners 106, 107, 108 and 109 will produce a resonance at an engine speed lower than that of runner set 110, 111, 112 and 113.

FIG. 9 shows the elevational view of the upper plane runners. As can be seen there and in FIG. 8, the runners emanate from the plenum and extend generally horizontally until they turn, and then they turn through an angle of substantially 90°. As can be seen in FIGS. 11 and 12, after this first turn of 90° the runners again turn at an angle less than 90°, but this time downwardly to their exits.

Again as seen in FIG. 8, the second set of runners, 110, 111, 112 and 113 also extend generally longitudinally of their plenum 104 and turn substantially at right angles to the longitudinal axis of the plenum and extend laterally to their exits. As can be seen in FIGS. 11 and 12 in this case, however, the runners curve upwardly slightly to meet the exits, thus providing some additional length, and also an overall lower profile for the manifold.

FIG. 10 shows in elevation runner sets 110, 111, 112 and 113. They emanate from plenum 104 at a lower elevation than the point of emanation of runner sets 106, 107, 108 and 109 from plenum 102. As can be seen, plenum 104 is significantly deeper than plenum 102. Nonetheless, the effect of atmosphere is in the plenums.

FIG. 13 shows the cross-sectional areas at various of the sectional planes shown in FIG. 8. As can be seen there, section "N" for runners 106 and 107 is substantially rectangular with the long legs of the rectangle being vertical. In the case of runners 106 and 107, this cross-sectional shape is maintained throughout their length. For runners 108 and 109, they too have common sectional shapes, as shown by section "T". The cross section is rectangular but squatter than section "N". Nonetheless, the cross-sectional areas are the same.

The constancy of shape of the cross section does not obtain throughout the length of runners 110, 111, 112 and 113. As can be seen for these runners, the entrance shape of runners 111 and 112 is shown by section "Q", whereas the entrance shape for runners 110 and 113 is shown by section "R". The entrance shape "R" departs from the rectangle on one of the long sides of the shape, describing almost a rectangle, but more accurately an irregular pentagon. Runner 110 goes from section "R" at its entrance to section "Q" after the first right angle turn, then to sedtion "P", the progression from "Q" to "P" resulting in a wider but shorter cross section. After reaching the shape of section "P" the runner maintains the shape substantially to its exit. For runner 111, the progression goes from section "Q" through the first right angle turn and then through a gradual transition to section "U", and that cross section is maintained to the runner's exit. Again, the runner goes from a tall, narrow aspect to a shorter and wider one. For runner 112, the section begins at "Q" and progresses to "U", shorter and wider, and then progresses to "V", shorter and wider yet. The runner maintains the shape from section "V" to its outlet. For runner 113, progression from entrance to exit is generally from a tall, narrow runner aspect to a short and wide one, almost square, close to the exit, as can be seen in sections "R", "Q", and "S".

As is readily apparent from the foregoing description, the runner peripheral shapes can vary markedly along a given runner and between runners. But this variation in peripheral shape does not affect the performance of the manifold, the cross-sectional areas being the determinative factor. The variation in shapes is used to accommodate the space the manifold must occupy, a space severely limited in elevation by the requirement that the manifold, carburetor and air cleaner mount under the hood of the vehicle for which they are used.

With reference to FIG. 13, the manifold resulting from the use of the cores of FIG. 8 and a cope and drag plate is shown in perspective. In general, the manifold has longitudinally extending mounting flanges 120 and 122 adapted to register with the cylinder heads of an engine with which the manifold is used and to in turn register the exits of the runners with the inlet ports of the engine. The runners of the manifold are indicated by the reference numerals previously used. Plenum 102 is divided from plenum 104 by a longitudinal wall 124. The manifold provides a carburetor mounting base 126 for registration of the carburetor throats directly over the plenums. A distributor mounting sleeve 130 is in the standard position for this particular engine. A water gallery 132 at the front of the manifold passes water from cylinder bank to cylinder bank and has an elbow fitting mounting boss 134 for a water hose to a radiator. A cooling water cross passage 136 to heat the base of the plenums extends across the manifold under the plenums to vaporize fuel on the plenum floors. A valley of the manifold has a base defined by a web 138. The mounting flanges rise upwardly and outwardly from the web to register with the general V-shaped valley of the engine. Regularly spaced drilled holes along the mounting flanges are for fasteners to secure the manifold to the engine.

Each of the runners constitutes an independent duct to one of the inlet ports of the engine using the manifold. The runner exits are all at the same elevational level. Advantage is taken of the envelope in which the manifold must fit to provide relatively long runner lengths. This is done by having the runners extend longitudinally and then turn abruptly at right angles to extend laterally to their exits. Also, the elevational range of the runners is used to effect longer runner lengths.

Plenums 102 and 104 have large compartments and small compartments. These compartments are to register with the primary and secondary throats of a four-barrel carburetor. Both compartments neck in slightly between them to define their large and small compartments.

The carburetor mounting base is set at an angle in the elevational views of the manifold. When the manifold is in a vehicle the manifold is at a slight angle and the carburetor mounting base becomes horizontal.

The determination of which runners are served by which plenum is by the engine's firing order, in addition to considerations of runner length. As previously stated, the engine firing order requires that the runners serving cylinders firing sequentially be from alternate plenums. By virtue of the isolation of plenums 102 and 104 no intercylinder interference between sequentially firing cylinders occurs. Runner lengths are longer than in a typical independent runner manifold. Runner lengths, again, are dictated by the desire to have each set of runners respond to some harmonic frequency of the fundamental frequency of air. At the fundamental frequency the geometry of the manifold required to effect it and resonance is not consistent with the high manifold velocities required to effect good throttle response and acceleration. For these performance criteria, throttle response and acceleration, the velocity of the mixture through the manifold should be relatively high and there should be relatively large quantities of air in motion during that portion of the inlet cycle in which the inlet valve is closing. At fundamental frequencies the runner length is too short to satisfy this requirement. The charge addition by resonance is when the inlet valve served by a resonating runner is open, preferably towards the end of the opening event so that some additional force is available to augment mixture velocity in overcoming the restricting effects of ascending pistons and the closing of the inlet valve.

The inertial effects of the fuel-air mixture in the runners results in some improvement in volumetric efficiency as a result of the mixture flowing at relatively high velocities. The energy of the mixture is a function not only of its velocity head but of static pressure head, and assuming only modest friction losses, the energy of the mixture in the same engine at different velocities will be the same. Nonetheless, a faster mixture will fill a cylinder better than a slower flowing one because of the greater inertia of motion.

The present invention has been described with reference to a preferred embodiment. The spirit and scope of the appended claims should not, however, necessarily be limited to the foregoing description.

What is claimed is:

1. In an intake manifold for combustion air for a reciprocating internal combustion engine of the type where combustion air velocity through the manifold is a direct function of engine speed, an improvement comprising:
    (a) a first set of runners of equal length and cross-sectional area, the length of each first set runner corresponding to a harmonic frequency of the fundamental frequency of air at standard temperature and the cross-sectional area of each first set runner being such that at a first engine speed combustion air velocity through the runner is substantially equal to the velocity at engine maximum torque; and
    (b) a second set of runners of equal length and cross-sectional area, the length of each second set runner corresponding to a harmonic frequency of the fundamental frequency of air at standard temperature different from that for the first runner set and the cross-sectional area of each second set runner being such that at a second engine speed, substantially different from the first engine speed, combustion air velocity through the runner is substantially equal to the velocity at engine maximum torque.

2. The intake manifold claimed in claim 1 wherein the manifold includes at least one plenum centrally disposed along a longitudinal axis of the manifold, the longitudinal axis paralleling the longitudinal axis of the engine with which the manifold is used.

3. The intake manifold claimed in claim 2 wherein each runner of each of the sets curves from the plenum to an exit disposed to register with an individual one of the inlet ports of the engine with which the manifold is to be used.

4. The intake manifold claimed in claim 3 wherein the cross-sectional area of each set of runners is different.

5. The intake manifold claimed in claim 4 wherein the length of each set of runners is different.

6. The intake manifold claimed in claim 3 wherein the cross-sectional area of each of the first set of runners is larger than the cross-sectional area of each of the second set of runners and the length of each of the first set of runners is shorter than the length of each of the second set of runners.

7. The intake manifold claimed in claim 6 wherein each runner leaves the plenum substantially parallel to the longitudinal axis of the manifold and then turns laterally to its exit.

8. The intake manifold claimed in claim 1 wherein the manifold includes at least two plenums, each serving one of the runner sets, the runners of the first and second runner sets serving alternate of the engine's cylinders in the sense of the engine's firing order.

9. The intake manifold claimed in claim 8 wherein the runners of the first set of runners has entrances leaving their plenum elevationally higher than the entrances of the second set of runners leaving their plenum.

10. The intake manifold claimed in claim 9 wherein the cross-sectional area of each of the first set of runners is larger than the cross-sectional area of each of the second set of runners and the length of each of the first set of runners is shorter than the length of each of the second set of runners.

11. The intake manifold claimed in claim 10 wherein the manifold is adapted for a V-type engine with half of the runners of each set adapted to serve one of the engine's cylinder banks and the other half of the runners of each set adapted to serve the other of the engine's cylinder banks.

12. The intake manifold claimed in claim 11 wherein each runner leaves the plenum substantially parallel to the longitudinal axis of the manifold and then turns laterally to its exit.

13. The intake manifold claimed in claim 11 wherein the plenums are side-by-side on opposite sides of the longitudinal center lines of the manifold.

14. The intake manifold claimed in claim 13 wherein the runners of elevationally higher entrance from their plenums are longer and have a smaller cross-sectional area than do the runners of the other set.

15. The intake manifold claimed in claim 14 wherein the runners of the lower entrance from their plenum extend upwardly from their entrances from the plenum to their exits.

16. The intake manifold claimed in claim 15 wherein each of the runners of both sets of runners curves substantially 90° between its plenum and its exit.

17. An improved intake manifold for an internal combustion engine comprising:
  (a) means defining a plenum for receiving a fuel and air mixture from a carburetor;
  (b) means defining a first set of runners from the plenum, each runner of the first set having a length corresponding to a harmonic frequency of the fundamental frequency of air at atmospheric temperature which produces resonance at a first engine speed, and a cross-sectional area that produces a velocity of air in the runners at the first engine speed corresponding to the velocity of air at engine speed maximum torque; and
  (c) means defining a second set of runners from the plenum, each runner of the second set having a length different from the length of the runners of the first set and corresponding to a different harmonic frequency of the fundamental frequency of air at atmospheric temperature than the first set and which produces resonance at a second engine speed substantially different from the first, and a cross-sectional area that produces a velocity of air in the second runners at the second engine speed corresponding to the velocity of air at engine speed maximum torque;

whereby, the two runner sets each produces relatively high engine torque at the engine speeds at which they produce resonance.

18. The improvement claimed in claim 17 wherein:
the plenum is central with respect to a longitudinal length of the manifold, which length parallels the length of the engine when the manifold is used.

19. The improvement claimed in claim 18 wherein:
each runner of each of the sets curves from the plenum to an exit disposed to register with an individual one of the inlet ports of the engine with which the manifold is to be used;
each runner of each of the sets along its curve has a trapezoidal cross-sectional shape with the wall on the inside of the curve being a short side of the trapezoid and the wall on the outside of the curve being a long side of the trapezoid, the trapezoid shape being such as to produce substantially equal static pressure throughout the cross section; and
the cross-sectional area of each runner of each set being substantially equal to the cross-sectional area of each other runner of its set and being constant throughout its length, the cross-sectional area of each runner in the first set being different from that of each runner of the second set.

20. The improvement claimed in claim 19 wherein the manifold is adapted for an in-line engine and the exit of each of the runners is at a plane common to all the exits of the runners.

21. The improvement claimed in claim 20 wherein each of the runners of both sets of runners has a cross-sectional shape change from trapezoidal to circular near the exits of the runners.

22. The improvement claimed in claim 20 wherein:
the runners of the first set are shorter than the runners of the second set and the cross-sectional area of each runner of the first set is larger than the cross-sectional area of each runner of the second set.

23. The improvement claimed in claim 18 wherein the manifold is adapted for an in-line engine and the exit of each of the runners is at a plane common to all the exits of the runners.

24. The improvement claimed in claim 23 wherein:
the runners of the first set are shorter than the runners of the second set and the cross-sectional area of each runner of the first set is larger than the cross-sectional area of each runner of the second set.

25. The improvement claimed in claim 24 wherein each runner extends from the plenum substantially parallel to the longitudinal axis and then turns laterally to its exit.

26. The improvement claimed in claim 25 wherein the runners have a common central plane.

* * * * *